US011505748B2

(12) United States Patent
Mesnil

(10) Patent No.: US 11,505,748 B2
(45) Date of Patent: Nov. 22, 2022

(54) PITCH GRANULES WHICH ARE SOLID AT ROOM TEMPERATURE

(71) Applicant: TOTAL MARKETING SERVICES, Puteaux (FR)

(72) Inventor: Jean-Pierre Mesnil, Puteaux (FR)

(73) Assignee: TOTAL MARKETING SERVICES, Puteaux (FR)

( * ) Notice: Subject to any disclaimer, the term of this patent is extended or adjusted under 35 U.S.C. 154(b) by 536 days.

(21) Appl. No.: 16/331,944

(22) PCT Filed: Sep. 5, 2017

(86) PCT No.: PCT/FR2017/052349
§ 371 (c)(1),
(2) Date: Mar. 8, 2019

(87) PCT Pub. No.: WO2018/046840
PCT Pub. Date: Mar. 15, 2018

(65) Prior Publication Data
US 2019/0241813 A1 Aug. 8, 2019

(30) Foreign Application Priority Data
Sep. 8, 2016 (FR) ...................................... 1658338

(51) Int. Cl.
| | | |
|---|---|---|
| *C10C 3/14* | (2006.01) |
| *C08J 7/06* | (2006.01) |
| *C08J 7/04* | (2020.01) |
| *B01J 2/30* | (2006.01) |
| *B01J 2/12* | (2006.01) |
| *B01J 2/00* | (2006.01) |
| *C08L 95/00* | (2006.01) |

(52) U.S. Cl.
CPC ................ *C10C 3/14* (2013.01); *B01J 2/003* (2013.01); *B01J 2/12* (2013.01); *B01J 2/30* (2013.01); *C08J 7/0427* (2020.01); *C08J 7/06* (2013.01); *C08L 95/00* (2013.01); *C08J 2395/00* (2013.01); *C08J 2401/08* (2013.01); *C08J 2403/02* (2013.01); *C08J 2403/04* (2013.01); *C08J 2405/00* (2013.01); *C08J 2405/04* (2013.01); *C08J 2405/12* (2013.01); *C08J 2471/02* (2013.01); *C08J 2489/06* (2013.01)

(58) Field of Classification Search
None
See application file for complete search history.

(56) References Cited

U.S. PATENT DOCUMENTS

| | | | |
|---|---|---|---|
| 3,026,568 | A | 3/1962 | Moar |
| 4,082,823 | A | 4/1978 | Augustine et al. |
| 4,107,382 | A | 8/1978 | Augustine et al. |
| 4,279,579 | A | 7/1981 | Froeschke |
| 5,382,348 | A * | 1/1995 | Muller ..................... C10C 3/14 208/22 |
| 2010/0154680 | A1 | 6/2010 | Friedrich et al. |
| 2018/0155629 | A1* | 6/2018 | Vincent .................. C08L 71/02 |

FOREIGN PATENT DOCUMENTS

| | | |
|---|---|---|
| FR | 914 704 A | 10/1946 |
| FR | 2 333 850 A1 | 7/1977 |
| GB | 2112411 A | 7/1983 |
| WO | 2004/020532 A1 | 3/2004 |
| WO | 2007/128636 A2 | 11/2007 |
| WO | 2008/022836 A1 | 2/2008 |
| WO | 2008/043635 A1 | 4/2008 |
| WO | 2008/141930 A1 | 11/2008 |
| WO | 2008/141932 A1 | 11/2008 |
| WO | 2009/015969 A1 | 2/2009 |
| WO | 2009/071467 A1 | 6/2009 |
| WO | 2009/153324 A1 | 12/2009 |
| WO | 2010/028261 A2 | 3/2010 |
| WO | 2011/000133 A1 | 1/2011 |
| WO | 2012/168380 A1 | 12/2012 |
| WO | WO 2016198782 * | 12/2016 |

OTHER PUBLICATIONS

Brunauer et al., "Adsorption of Gases in Multimolecular Layers," J. Am. Chem. Soc., Feb. 1938, vol. 60, No. 2, pp. 309-319.
Nov. 29, 2017 International Search Report issued in International Patent Application No. PCT/FR2017/052349.
Oct. 29, 2020 Office Action issued in Indian Patent Application No. 201947009552.

* cited by examiner

*Primary Examiner* — Ronak C Patel
(74) *Attorney, Agent, or Firm* — Oliff PLC

(57) ABSTRACT

Pitch granules including a core made up of a first composition including at least one pitch, the composition having a penetrability at 25° C. of 0 to 45 1/10 mm, a ring-and-ball softening temperature (TBA) of 55° C. to 175° C., understanding the penetrability as measured according to standard EN 1426 and the TBA as measured according to standard EN 1427, and a layer encapsulating at least one portion of the surface of the core, the layer being made up of a coating composition including at least one anti-caking agent.

19 Claims, No Drawings

PITCH GRANULES WHICH ARE SOLID AT ROOM TEMPERATURE

TECHNICAL FIELD

The present invention relates to pitch pellets which are solid at ambient temperature, in particular at elevated ambient temperature. The present invention also relates to a process for coating pitch pellets which are solid at ambient temperature, in particular at elevated ambient temperature.

The present invention also relates to a process for transporting and/or storing and/or handling pitch which is in the form of pitch pellets which are solid at ambient temperature, in particular at elevated ambient temperature.

PRIOR ART

In general, pitch is stored and transported hot, in bulk, in tank trucks or by boat at high temperatures of the order of 140° C. to 200° C. However, the hot storage and transportation of pitch presents certain drawbacks. First, the hot transportation of pitch in liquid form is considered hazardous and is governed by very strict regulations. This mode of transportation does not present any particular difficulties when the transportation equipment and infrastructure are in good condition. When such is not the case, it may become problematic: if the tank truck is not sufficiently thermally insulated, the viscosity of the pitch may increase during an excessively long journey. Pitch delivery distances are therefore limited. Secondly, maintaining pitch at high temperatures in tanks or in tank trucks consumes energy. In addition, maintaining pitch at high temperatures for a long period may affect the properties of the pitch.

To overcome the problems of transporting and storing pitch hot, packagings enabling the transportation and storage of pitches at ambient temperature have been developed. This mode of transporting pitch in packaging at ambient temperature represents only a tiny fraction of the amounts transported worldwide, but it meets very real needs for geographical regions that are difficult and expensive to access via conventional transportation means.

An example that may be mentioned of packaging for cold transportation that is currently used is the packaging of pitch at ambient temperature in metal drums. This means is increasingly coming under question from an environmental viewpoint since the pitch stored in drums must be heated before it is used. However, this operation is difficult to perform for this type of packaging, and the drums constitute waste after use. Moreover, the storage of pitch at ambient temperature in drums leads to losses since pitch is very viscous and part of the product remains on the walls of the drum during transfer into the tanks. As regards the handling and transportation of pitch in these drums, they may prove to be difficult and hazardous if the specialized equipment for handling drums is not available to transporters or at the site of use of the pitch.

FR 233 850 discloses a process and a machine for manufacturing coated pitch pellets. The coating of the pellets consists of a finely divided carbon-based material.

FR 914 704 discloses a process for preparing pitch in the form of coated pellets. The coating of the pellets consists of inorganic substances that are sparingly soluble or insoluble in pitch.

There is a need to provide a pitch which can overcome the drawbacks of the prior art.

More particularly, there is a need to provide pitch which can be transported and/or stored and/or handled at elevated ambient temperatures, especially at a temperature below 120° C., preferably between 30° C. and 100° C.

The Applicant has discovered, surprisingly, a novel pitch composition which can be transported and/or stored and/or handled at elevated ambient temperature over long periods, without losses of material, and for which the properties of the pitch are conserved over time.

More precisely, the Applicant has demonstrated that this novel pitch pellet composition makes it possible to withstand creep under transportation and/or storage and/or handling conditions over very long periods.

SUMMARY OF THE INVENTION

One subject of the invention is pellets comprising:
a core consisting of a first composition comprising at least one pitch, said composition having a penetrability at 25° C. ranging from 0 to 45 1/10 mm and a ring and ball softening point (RBSP) ranging from 55° C. to 175° C., it being understood that the penetrability is measured according to the standard EN 1426 and that the RBSP is measured according to the standard EN 1427, and
a layer coating at least part of the surface of the core, said layer consisting of a coating composition comprising at least one anticaking agent.

According to a preferred embodiment, the anticaking compound is chosen from talc; fines generally less than 125 µm in diameter, with the exception of limestone fines, such as siliceous fines; sand, such as Fontainebleau sand; cement; carbon; wood residues, such as lignin, lignosulfonate, conifer needle powders or conifer cone powders, in particular of pine; glass powder; clays, such as kaolin, bentonite or vermiculite; alumina, such as alumina hydrates; silica; silica derivatives, such as fumed silica, functionalized fumed silica, in particular hydrophobic or hydrophilic fumed silica, pyrogenic silicas, in particular hydrophobic or hydrophilic pyrogenic silicas, silicates, silicon hydroxides, silicon oxides, rice husk ash; plastic powder; lime; plaster; rubber powder; polymer powder, where the polymers are polymers such as styrene/butadiene (SB) copolymers or styrene/butadiene/styrene (SBS) copolymers; and mixtures thereof.

According to one embodiment of the invention, the anticaking agent is chosen from talc; fines generally less than 125 µm in diameter, with the exception of limestone fines, such as siliceous fines; wood residues such as lignin, lignosulfonate, conifer needle powders, conifer cone powders, in particular pine powders; glass powder; sand such as Fontainebleau sand; fumed silicas, in particular hydrophobic or hydrophilic fumed silicas; pyrogenic silicas, in particular hydrophobic or hydrophilic pyrogenic silicas; and mixtures thereof.

According to a preferred embodiment, the anticaking agent is chosen from pyrogenic silicas, especially hydrophobic or hydrophilic pyrogenic silicas, and mixtures thereof.

According to one embodiment of the invention, the coating composition also comprises at least one viscosifying compound.

According to a preferred embodiment, the viscosifying compound is chosen from:
gelling compounds preferably of plant or animal origin, such as: gelatin, agar-agar, alginates, cellulose derivatives, starches, modified starches, or gellan gums;
polyethylene glycols (PEGs) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);

mixtures of such compounds.

According to a preferred embodiment, the viscosifying compound is chosen from gelatin or a PEG and the anti-caking compound is chosen from fines generally less than 125 μm in diameter; wood residues such as lignin, conifer needle powders and conifer cone powders; rubber crumb; SBS copolymer powder; fumed silicas, in particular hydrophobic or hydrophilic fumed silicas; pyrogenic silicas, in particular hydrophobic or hydrophilic pyrogenic silicas; and mixtures thereof.

According to one embodiment of the invention, the coating composition represents between 0.2% and 10% by mass, preferably between 0.5% and 8% by mass and more preferentially between 0.5% and 5% by mass relative to the total mass of the core of the pitch pellets.

According to one embodiment of the invention, the size of the pitch pellets is such that the longest mean dimension is less than or equal to 50 mm, preferably from 2 to 30 mm.

Another subject of the invention relates to a process for coating pitch pellets, comprising:

i) the forming of the core of the pellets using a first composition comprising at least one pitch, ii) the coating of the pellets over all or part of their surface with a coating composition comprising at least one anticaking compound.

Another subject of the invention relates to a process for transporting and/or storing and/or handling pitch at ambient temperature, said pitch being transported and/or stored and/or handled in the form of pitch pellets.

DETAILED DESCRIPTION

The objectives that the Applicant set itself have been achieved by means of the development of pitch compositions in a divided form, such as pitch pellets, for transporting and/or storing and/or handling pitch, without losses of material and under satisfactory transportation and/or storage and/or handling conditions.

A first subject of the invention relates to pellets whose core is formed from a composition comprising at least one pitch, said composition having a penetrability at 25° C. ranging from 0 to 45$^{1}/_{10}$ mm and a ring and ball softening point (RBSP) ranging from 55° C. to 175° C., it being understood that the penetrability is measured according to the standard EN 1426 and that the RBSP is measured according to the standard EN 1427, said pellets being covered over at least part of their surface with a coating composition comprising at least one anticaking agent.

Preferably, the invention relates to pellets whose core consists of a pitch with a penetrability at 25° C. ranging from 0 to 45$^{1}/_{10}$ mm and a ring and ball softening point (RBSP) ranging from 55° C. to 175° C., it being understood that the penetrability is measured according to the standard EN 1426 and that the RBSP is measured according to the standard EN 1427, said pellets being covered over at least part of their surface with a coating composition comprising at least one anticaking agent.

The term "ambient temperature" means the temperature resulting from the climatic conditions which is greater than or equal to 30° C., under which the pitch is transported and/or stored and/or handled. More specifically, the ambient temperature is equivalent to the temperature reached during the transportation and/or storage and/or handling of the pitch, this temperature being greater than 30° C., it being understood that the ambient temperature implies that no heat is supplied other than that resulting from the climatic conditions.

The term "pitch which is solid at ambient temperature" means a pitch which has a solid appearance at ambient temperature under the transportation and/or storage and/or handling conditions. More precisely, the term "pitch which is solid at ambient temperature" means a pitch which conserves its solid appearance throughout the transportation and/or storage and/or handling at ambient temperature, i.e. a pitch which does not undergo creep at a temperature above 30° C. under its own weight and, moreover, which does not undergo creep when it is subjected to a temperature above 30° C. and to pressure forces arising from the transportation and/or storage and/or handling conditions.

The term "penetrability" means here the "needle penetrability" measurement, which is performed by means of an NF EN 1426 standardized test at 25° C. (P25). This penetrability characteristic is expressed in tenths of a millimeter (dmm or $^{1}/_{10}$ mm). The needle penetrability, measured at 25° C. according to the standardized test NF EN 1426, represents the measurement of the penetration into a pitch sample, after a time of 5 seconds, of a needle whose weight with its support is 100 g. The standard NF EN 1426 replaces the endorsed standard NF T 66-004 of December 1986 with effect from Dec. 20, 1999 (decision of the Director General of AFNOR dated Nov. 20, 1999).

The term "softening point" means the "ring and ball softening point" measurement which is performed by means of the standardized test NF EN 1427. The ring and ball softening point (RBSP), also known as the ring and ball softening temperature, corresponds to the temperature at which a steel ball of standard diameter, after having passed through the test material (stuck in a ring), reaches the bottom of a standardized tank filled with a liquid which is gradually heated and into which the apparatus has been immersed.

The term "covered over at least part of their surface" means that the cores of the pitch pellets are covered over at least 90% of their surface, preferably at least 95%, more preferentially at least 99%.

The term "consists essentially of" followed by one or more features means that, besides the components or steps specifically listed, components or steps which do not significantly modify the properties and features of the invention may be included in the process or the material of the invention.

The expression "between X and Y" includes the limits. This expression thus means that the targeted range comprises the values X, Y and all the values ranging from X to Y.

Pitch

According to the English dictionary, the term "pitch" means a distillation residue of petroleum, of hard coal, of wood or of other organic molecules.

The invention relates herein to the residues from the distillation of petroleum tars, also known as "petroleum pitch". For the purposes of the invention, the petroleum pitches have different characteristics to bitumens and, consequently, are not included among bitumens.

For the purposes of the invention, use will be made, independently of each other, of the terms "pitch", "petroleum pitch" and "deasphalting pitch".

The pitches may be obtained via conventional manufacturing processes in a refinery. The manufacturing process corresponds to the sequence of atmospheric distillation and vacuum distillation. In a first stage, crude oil is subjected to distillation at atmospheric pressure, which leads to the production of a gaseous phase, of various distillates and of an atmospheric distillation residue. The residue from the atmospheric distillation is then itself subjected to a distillation under reduced pressure, known as vacuum distillation, which makes it possible to separate a heavy gas oil, various distillate fractions and a vacuum distillation residue. This vacuum distillation residue contains "petroleum pitch" in variable concentration.

It is possible to obtain "petroleum pitch" according to two processes:

First Process:

The vacuum distillation residue is subjected to a deasphalting operation by addition of a suitable solvent, such as an alkane, for instance propane, which thus makes it possible to precipitate the pitch and to separate it from the light fractions, such as the deasphalted oil.

Second Process:

The vacuum distillation residue is subjected to solvent extraction, more specifically with furfural. This heterocyclic aldehyde has the distinguishing feature of selectively dissolving aromatic and polycyclic compounds. This process thus makes it possible to remove the aromatic extracts and to recover the "petroleum pitch".

According to one embodiment, the pitch is an oxidized pitch.

Preferably, the oxidized pitch according to the invention is obtained by oxidation of a mixture comprising pitch and a diluent, such as a light gasoline, also known as "flux", subjected to an oxidation operation in a blowing tower in the presence of a catalyst, at a fixed temperature and at a given pressure.

For example, oxidized pitches may be manufactured in a blowing unit by passing a stream of air and/or oxygen through a starting pitch. This operation may be performed in the presence of an oxidation catalyst, for example phosphoric acid. The oxidation is generally performed at high temperatures, of the order of 200 to 300° C., for relatively long periods typically between 30 minutes and 2 hours, continuously or in batches. The oxidation time and temperature are adjusted as a function of the properties targeted for the oxidized pitch and as a function of the quality of the starting pitch.

The mechanical qualities of the pitches are generally evaluated by determining a series of mechanical features via standardized tests, the most widely used of which are the needle penetrability expressed in $1/10$ mm and the softening point determined by the ring and ball test, also known as the ring and ball softening point (RBSP).

Preferably, the pitch according to the invention has a needle penetrability at 25° C. of from 0 to 45$1/10$ mm, preferably from 0 to 40$1/10$ mm, more preferentially from 0 to 30$1/10$ mm and even more advantageously from 0 to 20$1/10$ mm, it being understood that the penetrability is measured according to the standard EN 1426.

Preferably, the pitch according to the invention has a ring and ball softening point (RBSP) of between 55° C. and 175° C., preferably from 75° C. to 175° C., more preferentially from 100° C. to 175° C. and even more advantageously from 115° C. to 175° C. Among examples of pitches used in the invention, there are pitches having, respectively, a ring and ball softening point (RBSP) of between 115° C. and 125° C., between 135° C. and 145° C. or between 165° C. and 175° C., it being understood that the RBSP is measured according to the standard EN 1427.

Preferably, the pitch according to the invention has a needle penetrability at 25° C. of from 0 to 45$1/10$ mm, preferably from 0 to 40$1/10$ mm, more preferentially from 0 to 30$1/10$ mm and even more advantageously from 0 to 20$1/10$ mm, it being understood that the penetrability is measured according to the standard EN 1426, and a ring and ball softening point (RBSP) of between 55° C. and 175° C., it being understood that the RBSP is measured according to the standard EN 1427.

Preferably, the pitch according to the invention has a needle penetrability at 25° C. of from 0 to 45$1/10$ mm, it being understood that the penetrability is measured according to the standard EN 1426, and a ring and ball softening point (RBSP) of between 55° C. and 175° C., preferably from 75° C. to 175° C., more preferentially from 100° C. to 175° C. and even more advantageously from 115° C. to 175° C., it being understood that the RBSP is measured according to the standard EN 1427.

The pitch pellets according to the invention may have, within the same population of pellets, one or more shapes chosen from a cylindrical, spherical or ovoid shape. More specifically, the pitch pellets according to the invention preferably have a cylindrical or spherical shape.

The forming of the core of the pellets from pitch may be performed according to any known process, for example according to the manufacturing process described in U.S. Pat. No. 3,026,568, WO 2009/153324 or WO 2012/168380. According to a particular embodiment, the forming of the pitch pellets may be performed by draining, in particular using a drum.

Other techniques may be used in the process for manufacturing the pitch pellets, in particular molding, pelletizing and extrusion.

According to one embodiment of the invention, the size of the pitch pellets is such that the longest mean dimension is preferably less than or equal to 50 mm, more preferentially from 2 to 30 mm and advantageously from 5 to 20 mm. For example, the use of a die makes it possible to control the manufacture of pellets of a chosen size. Screening makes it possible to select pellets as a function of their size.

According to the invention, the composition of which the core of the pellets is constituted comprises at least one pitch. This composition may also comprise one or more additives.

According to a preferred embodiment, the core of the pellets is constituted of a pitch or a mixture of pitches.

Anticaking Agent

The term "anticaking agent" or "anticaking compound" means any compound which limits, reduces, inhibits or delays the agglomeration and/or adhesion of the pellets together during their transportation and/or storage and/or handling at ambient temperature and which ensures their fluidity during handling.

Preferably, the pitch pellets according to the invention are covered over at least part of their surface with a composition comprising at least one anticaking agent as defined below, preferably over all of their surface.

Preferably, the anticaking agent is chosen from talc; fines generally less than 125 μm in diameter, with the exception of limestone fines, such as siliceous fines; sand, such as Fontainebleau sand; cement; carbon; wood residues, such as lignin, lignosulfonate, conifer needle powders or conifer cone powders, in particular of pine; glass powder; clays, such as kaolin, bentonite or vermiculite; alumina, such as alumina hydrates; silica; silica derivatives, such as fumed silica, functionalized fumed silica, in particular hydrophobic or hydrophilic fumed silica, pyrogenic silicas, in particular hydrophobic or hydrophilic pyrogenic silicas, silicates, silicon hydroxides and silicon oxides, rice husk ash; plastic powder; lime; plaster; rubber powder; polymer powder, where the polymers are polymers such as styrene/butadiene (SB) copolymers or styrene/butadiene/styrene (SBS) copolymers; and mixtures thereof.

Advantageously, the anticaking agent is chosen from talc; fines generally less than 125 μm in diameter, with the exception of limestone fines, such as siliceous fines; wood residues such as lignin, lignosulfonate, conifer needle powders, conifer cone powders, in particular pine powders; glass powder; sand such as Fontainebleau sand; fumed silicas; in particular hydrophilic and hydrophobic fumed silicas; pyrogenic silicas, in particular hydrophobic or hydrophilic pyrogenic silicas; and mixtures thereof.

By way of example, the anticaking agent may be fumed silicas. The fumed silicas used in the invention are commercially available and may, for example, be sold by Evonik Degussa under the brand name Aerosil®, for instance Aerosil® 200, by Cabot Corporation under the brand names Cab-O-Sil® and Cab-O-Sperse® or by Wacker Chemie AG under the brand name HDK®.

The anticaking compound is preferably chosen from pyrogenic silicas.

For the purposes of the invention, the "fumed silica" and "pyrogenic silica" compounds have the same chemical definition and are recorded under the same CAS number 112 945-52-5. Consequently, for the purposes of the invention, these compounds may be employed without discrimination between them.

The term "pyrogenic silica" means either a pyrogenic silica or a pyrogenic silica derivative.

The term "pyrogenic silica" means a compound obtained by the vapor-phase hydrolysis of chlorosilanes, such as silicon tetrachloride, in a flame of oxygen and hydrogen. Such processes are generally termed pyrogenic processes, the overall reaction of which is: $SiCl_4+H_2+O_2 \rightarrow SiO_2+4 HCl$.

Pyrogenic silicas are distinguished from the other silicon dioxides in that they have an amorphous structure. These silicas, of high purity (>99.8% silica), have a weak hydrophilic nature (no microporosity).

Preferably, the pyrogenic silica compound is pyrogenic silica.

According to one embodiment of the invention, the pyrogenic silica compound has a specific surface area of between 25 and 420 $m^2/g$, preferentially between 90 and 330 $m^2/g$, more preferentially between 120 and 280 $m^2/g$.

The specific surface area of the pyrogenic silica, defined in $m^2/g$, commonly known as the "surface area" or "SA", is measured according to the method of S. Brunauer, P. H. Emmett and I. Teller, J. Am. Chemical Society, 60: 309 (1938) (BET).

According to one embodiment of the invention, the pyrogenic silica compound has a mean particle size of between 5 and 50 nm.

According to one embodiment of the invention, the pyrogenic silica compound has a pH of between 3 and 10, when it is in the aqueous phase.

According to one embodiment of the invention, the pyrogenic silica compound has a carbon content of between 0.1% and 10% by weight, relative to the total weight of the pyrogenic silica compound.

According to one embodiment of the invention, the pyrogenic silica compound is chosen from a hydrophilic pyrogenic silica compound, a hydrophobic pyrogenic silica compound, and mixtures thereof.

Preferably, the pyrogenic silica compound is a hydrophilic pyrogenic silica compound.

The term "hydrophilic" refers to a compound which is miscible with water in all proportions.

The pyrogenic silica compound, or pyrogenic silica derivative, used within the meaning of the invention may be chemically modified.

Various types of pyrogenic silica compounds are described in the following patent applications and can be used in the present invention:

silanized pyrogenic silicas, as described in WO 2004/020532 or in WO 2007/128636, hydrophilic pyrogenic silicas, as described in WO 2009/071467 and WO 2011/000133, filed in the name of Degussa AG or Degussa GmbH, fumed silicas rendered hydrophobic by a treatment using polysiloxanes, as described in WO 2008/141932, or by silanization, as described in WO 2008/141930, silicas doped with potassium oxide, as described in WO 2008/043635 and WO 2008/022836, silicas in the form of aggregates of primary particles, as described in WO 2009/015969, filed in the name of Evonik Degussa GmbH, or in WO 2010/028261, filed in the name of Cabot Corporation.

The pyrogenic silica compound may be used alone or as a mixture in a coating composition.

Whether it is used alone or as a mixture in a composition, the pyrogenic silica compound may be used in the process according to the invention in the form of a powder or as a dispersion in a solvent which evaporates after application.

Preferably, when the composition comprises at least one pyrogenic silica compound and at least one solvent, the composition comprises from 5% to 70% by weight of pyrogenic silica compound, relative to the total weight of the composition, more preferentially from 20% to 40% by weight.

Preferably, the solvent is an organic solvent or water. The term "organic solvent" means any solvent which is immiscible with a bitumen, such as an alcohol, for example ethanol.

According to one embodiment of the invention, the core of the pellets also comprises at least one anticaking compound as defined above, preferably pyrogenic silica.

Preferably, the core of the pellets of the first composition also comprises between 0.5% and 20% by mass, preferably between 2% and 20% by mass, more preferentially between 4% and 15% by mass, of the pyrogenic silica compound relative to the total mass of the first composition.

According to one embodiment of the invention, the mass of the anticaking compound covering at least part of the surface of the core of the pellets is between 0.2% and 10% by mass, preferably between 0.5% and 8% by mass, more preferentially between 0.5% and 5% relative to the total mass of the core of the pellets.

Preferably, the anticaking layer covering the core of the pitch pellets according to the invention is continuous so that at least 90% of the surface of said pellets is covered with an anticaking agent, preferably at least 95%, more preferentially at least 99%.

Also preferably, the average thickness of the anticaking layer is greater than or equal to 20 μm, more preferentially between 20 and 100 μm.

Advantageously, the anticaking layer must be sufficiently thick so that it is continuous.

The pitch pellets according to the invention are covered with the anticaking agent according to any known process, for example according to the process described in U.S. Pat. No. 3,026,568.

The pitch, forming the core of the pellets covered with at least one anticaking compound, can be easily handled after a prolonged period of transportation and/or storage.

Viscosifying Compound

According to one embodiment of the invention, the pitch pellets may be covered over at least part of their surface with a coating composition comprising at least one anticaking agent as defined above and at least one viscosifying compound, preferably over all of their surface.

The various embodiments, variants, preferences and advantages described above for the anticaking agents also apply when the coating composition comprises at least one anticaking agent and at least one viscosifying compound.

The term "viscosifying agent" or "viscosifying compound" means a compound which has the property of decreasing the fluidity of a liquid or a composition and thus of increasing the viscosity thereof.

For the purposes of the invention, the terms "viscosifying agent" and "viscosifying compound" are used equivalently and independently of each other.

For the purposes of the invention, the viscosifying compound is a material with a dynamic viscosity greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C. The viscosity of a viscosifying agent according to the invention is measured at 65° C. by means of a Brookfield CAP 2000+ viscometer and at a rotation speed of 750 rpm. The measurement is read after 30 seconds for each temperature.

Preferably, the viscosifying compound is chosen from:
gelling compounds preferably of plant or animal origin, such as: gelatin, agar-agar, alginates, cellulose derivatives, starches, modified starches, or gellan gums;
polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
mixtures of such compounds.

Advantageously, the viscosifying compound is chosen from:
gelling compounds preferably of plant or animal origin, such as gelatin, agar agar, alginates, cellulose derivatives or gellan gums;
polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
mixtures of such compounds.

According to a preferred embodiment of the invention, the viscosifying compound is chosen from gelatin or a PEG and the anticaking compound is chosen from fines generally less than 125 μm in diameter; wood residues such as lignin, conifer needle powders and conifer cone powders; rubber crumb; SBS copolymer powder; fumed silicas, in particular hydrophilic and hydrophobic fumed silicas; pyrogenic silicas, in particular hydrophobic or hydrophilic pyrogenic silicas; and mixtures thereof.

More preferably, the viscosifying compound is chosen from gelatin or a PEG and the anticaking compound is chosen from fines, generally less than 125 μm in diameter; lignin; rubber crumb; fumed silicas, in particular hydrophilic and hydrophobic fumed silicas; pyrogenic silicas, in particular hydrophobic or hydrophilic pyrogenic silicas; SBS copolymer powder; and mixtures thereof.

Advantageously, the viscosifying compound is chosen from gelatin or a PEG and the anticaking compound is chosen from pyrogenic silicas, in particular hydrophilic or hydrophobic pyrogenic silicas, and mixtures thereof.

According to one embodiment of the invention, the coating composition comprises at least 10% by mass of at least one viscosifying compound relative to the total mass of the composition, preferably from 10% to 90% by mass and more preferentially from 10% to 85% by mass.

Advantageously, when the viscosifying compound is a gelling agent, for instance gelatin, the coating composition comprises from 10% to 90% by mass of viscosifying compound relative to the total mass of the composition, preferably from 15% to 85% by weight and better still from 15% to 60%.

Advantageously, when the viscosifying agent is a gelling agent, for instance gelatin, the coating composition comprises from 10% to 90% by weight of anticaking compound relative to the total mass of the composition, preferably from 15% to 85% and better still from 40% to 85%.

Advantageously, when the viscosifying compound is a PEG, for instance a PEG with a molecular weight of between 800 g·mol$^{-1}$ and 8000 g·mol$^{-1}$, the coating composition comprises from 10% to 90% by mass of viscosifying compound relative to the total mass of the composition, preferably from 40% to 90% and better still from 60% to 90%.

Advantageously, when the viscosifying compound is a PEG, for instance a PEG with a molecular weight of between 800 g·mol$^{-1}$ and 8000 g·mol$^{-1}$, the coating composition comprises from 10% to 90% by mass of anticaking compound relative to the total mass of the composition, preferably from 10% to 60% and better still from 10% to 40%.

Preferentially, the coating composition comprises at least 10% by mass of an anticaking compound relative to the total mass of the composition, preferably from 10% to 90% by mass and even more preferentially from 15% to 90% by mass.

According to one embodiment of the invention, the coating composition comprising at least one anticaking agent and at least one viscosifying compound covering the core of the pitch pellets according to the invention is preferably continuous, so that at least 90% of the surface of the core of said pellets is covered with an anticaking agent, preferably at least 95% and more preferentially at least 99%.

Preferably also, the mean thickness of the coating composition comprising at least one anticaking agent and at least one viscosifying compound covering the core of the pitch pellets according to the invention is preferably greater than or equal to 20 μm, more preferentially between 20 and 100 μm.

Advantageously, the coating composition comprising at least one anticaking agent and at least one viscosifying compound covering the core of the pitch pellets according to the invention must be sufficiently thick, so that it is continuous.

According to one embodiment of the invention, the coating composition covering at least part of the surface of the core of the pellets is between 0.2% and 10% by mass, preferably between 0.5% and 8% by mass and more preferentially between 0.5% and 5% relative to the total mass of the core of the pitch pellets.

Preferably, the composition is solid at ambient temperature, including at elevated ambient temperature.

According to one embodiment of the invention, the pitch pellets may also comprise one or more other coating layers, based on anticaking agent covering all or part of the composition comprising at least one anticaking agent and at least one viscosifying agent.

Process for Coating the Pellets:

Another subject of the invention relates to a process for coating pitch pellets which are solid at ambient temperature, covered over at least part of their surface with an anticaking agent, this process comprising:

i) the forming of the core of the pellets using a first composition comprising at least one pitch, ii) the coating of the core of the pellets over all or part of their surface with a coating composition comprising at least one anticaking compound.

According to one embodiment, the pellets obtained in step ii) may be dried at a temperature ranging from 20 to 60° C., for a period ranging from 5 minutes to 5 hours, preferably from 5 minutes to 2 hours.

In this embodiment, the application step ii) preferably takes place by dusting, sprinkling, spraying, etc.

According to another embodiment, the process for coating pitch pellets which are solid at ambient temperature, covered over at least part of their surface with an anticaking agent and with a viscosifying agent, comprises:

i) the forming of the core of the pellets using a first composition comprising at least one pitch, ii) the coating of the pellets over all or part of their surface with a coating composition comprising at least one anticaking compound and at least one viscosifying compound.

According to one embodiment, the pellets obtained in step ii) may be dried at a temperature ranging from 20 to 60° C., for a period ranging from 5 minutes to 5 hours, preferably from 5 minutes to 2 hours.

In this embodiment, the application step ii) takes place by dipping, spraying, coextrusion, etc.

Advantageously, the first composition is constituted of a pitch or a mixture of pitches.

Process for Transporting and/or Storing and/or Handling Pitch

Another subject of the invention also relates to a process for transporting and/or storing and/or handling pitch at ambient temperature, said pitch being transported and/or stored and/or handled in the form of pitch pellets which are solid at ambient temperature.

Preferably, the pitch is transported and/or stored at elevated ambient temperature for a period of more than or equal to 2 months, preferably 3 months.

Preferably, the elevated ambient temperature is from 20° C. to 100° C., preferably from 20° C. to 100° C., more preferentially from 40° C. to 100° C. and even more preferentially from 40° C. to 100° C.

The pitch pellets according to the invention have the advantage of conserving their divided form, and thus of being able to be handled, after storage and/or transportation at elevated ambient temperature. They in particular have the capacity of flowing under their own weight without undergoing creep, which allows them to be stored packaged in bags, drums or containers of any shape or volume, and then to be transferred from this packaging into equipment, such as worksite equipment (tank, mixer, etc.).

The pitch pellets are preferably transported and/or stored in bulk in 1 kg to 100 kg or 500 kg to 1000 kg bags, commonly known in the road sector as "big bags", said bags preferably being made of hot-melt material. They may also be transported and/or stored in bulk in 5 kg to 30 kg boxes or in 100 kg to 200 kg drums.

The various embodiments, variants, preferences and advantages described above for each of the subjects of the invention apply to all the subjects of the invention and may be taken separately or in combination.

The invention is illustrated by the following examples, which are given without any limitation.

Experimental Section

Materials and Methods

The properties of the pitches are measured by means of the methods described below:

Needle penetrability at 25° C. (P25): units=$\frac{1}{10}$ mm, standard EN 1426

Ring and ball softening point (RBSP): units=° C., standard EN 1427.

Materials:

Pitch PIT, the characteristics of which are presented below in table 1:

TABLE 1

| | Penetrability $P_{25}$ | RBSP |
|---|---|---|
| PIT | 0-4 | 135-145° C. |

Fumed silica available commercially from the company Evonik under the brand name Aerosil®200

In the examples that follow, two types of pellets are prepared:

Pitch PIT pellets ($G_0$)

Pitch PIT pellets ($G_1$), the surface of which is covered with fumed silica.

1. Preparation of the Cores of the Solid Pitch Pellets

The cores of the pitch pellets $G_0$ are prepared from the pitch PIT according to one of the following protocols.

1.1 General Method for Preparing the Pitch Cores of the Pellets

The pitch PIT is heated at 220° C. for two hours in an oven and then poured into a silicone mold having different holes of spherical shape, so as to form the solid pitch cores. After having observed the solidification of the pitch in the mold, the surplus is leveled off using a blade heated with a Bunsen burner. After 30 minutes, the solid pitch in the form of uncoated pellets is removed from the mold and stored in a tray covered with silicone paper.

1.2 General Method for Preparing the Pitch Cores of the Pellets According to the Invention Via an Industrial Process For the implementation of this method, use may be made of a device and of a process as described in great detail in U.S. Pat. No. 4,279,579. Various models of this device are commercially available from the company Sandvik under the trade name Rotoform.

Pitch pellets $G_0$ may also be obtained from the pitch PIT poured into the tank of such a device and maintained at a temperature of between 180° C. and 270° C.

One or more injection nozzles allow the transfer of the pitch PIT inside the pelletizing twin drum including an external rotating drum, the two drums being equipped with slits, nozzles and orifices allowing the pelletizing of drops of pitch through the first stationary drum and the orifices between 2 and 10 mm in diameter of the external rotating drum. The pitch drops are deposited on the upper face of a horizontal conveyor belt driven by rollers.

2. General Method for Preparing the Solid Pitch Pellets According to the Invention Comprising a Coating Layer The pitch pellets obtained according to methods 1.1 and 1.2 are left at ambient temperature for 10 to 15 minutes. The pellets thus formed are covered on their surface with an anticaking compound and then screened to remove the excess anticaking compound.

The pitch pellets $G_1$ according to the invention are prepared from the pitch pellets $G_0$ according to the method described above, using pyrogenic silica, commercially available under the reference Aerosil 200®, as anticaking compound.

The mass percentage of the coating for the pitch pellets $G_1$ is about 1% by mass relative to the total mass of bitumen of the pellets.

3. Test of Static Strength of the Pitch Pellets $G_0$ and $G_1$

The aim of this test is to simulate the crushing strength of pellets contained in an 800 kg big bag placed on a 1.21 m² pallet. For the purpose of representing this test on the laboratory scale, a 208 g mass is applied to a surface of a piston 2 cm in diameter.

The laboratory assembly is constituted of a syringe containing the pellets, on which is installed a box filled with granulates for a mass of 208 g. The whole is placed in an oven set at 50° C. for 24 hours. If there is no deformation and agglomeration of the pellets, the temperature is increased by 5° C. for a time of 24 hours. After each test, the piston is removed and the compression strength of the pellets is evaluated visually, in particular their appearance and their capacity for agglomerating. The observations are collated in table 2 below.

TABLE 2 state of the pellets after static tests

|  | $G_0$ | $G_1$ |
| --- | --- | --- |
| Load strength at 50° C. | ++ | +++ |
| Load strength at 55° C. | + | +++ |
| Load strength at 60° C. | -- | +++ |
| Load strength at 65° C. | -- | +++ |
| Load strength at 70° C. | -- | +++ |
| Load strength at 75° C. | -- | +++ |
| Load strength at 80° C. | -- | +++ |
| Load strength at 85° C. | -- | +++ |
| Load strength at 90° C. | -- | +++ |

+++: the pellets keep their initial shape and do not adhere together.
++: the pellets do not adhere together but are slightly deformed.
+: the pellets adhere together slightly.
−: the pellets are partially molten.
−−: the pellets are molten.

4. Test of Dynamic Strength of the Pitch Pellets $G_0$ and $G_1$

The aim of this test is to simulate the effects of oscillation and vibration to which the pellets are subjected during transportation. 100 g of pellets are placed in a 250 ml beaker, which is placed horizontally on an agitating shaker table at maximum speed for 1 hour 15 minutes and at 50° C. After each test, the resistance of the pellets to the oscillations and vibrations, in particular their appearance and their capacity for agglomeration, are evaluated visually. The observations are collated in table 3 below.

TABLE 3 state of the pellets after dynamic tests

|  | $G_0$ | $G_1$ |
| --- | --- | --- |
| Resistance to the oscillations/vibrations at 50° C. | -- | +++ |

+++: the pellets keep their initial shape and do not adhere together.
++: the pellets do not adhere together but are slightly deformed.
+: the pellets adhere together slightly.
−: the pellets are partially molten.
−−: the pellets are molten.

The pellets $G_1$ show very good load strength up to 90° C. and also very good resistance to oscillations and vibrations at 50° C. insofar as they do not deform and do not agglomerate together, when compared with the pellets $G_0$ which have a tendency to agglomerate during their transportation or storage, in particular at temperatures of greater than or equal to 60° C. Thus, the handling of said pellets $G_0$ will be less easy than that of the pellets $G_1$. In particular, if the pitch pellets are transported in sacks or big bags, there will be a further risk of the agglomerated pellets $G_0$ leaking from the sacks or big bags, making it difficult to handle said sacks or big bags, which will then have a tendency to stick together. Their transfer into worksite equipment may also be difficult as a result of their behavior.

The invention claimed is:

1. Pitch pellets comprising:
a core constituted of a first composition comprising at least one pitch, said composition having a penetrability at 25° C. ranging from 1 to 45 1/10 mm and a ring and ball softening point (RBSP) ranging from 55° C. to 175° C., wherein the penetrability is measured according to the standard EN 1426 and that the RBSP is measured according to the standard EN 1427, and
a layer coating at least part of the surface of the core, said layer being constituted of a coating composition comprising at least one anticaking agent chosen from pyrogenic silicas, and mixtures thereof, wherein the pyrogenic silicas have a specific surface area of between 120 and 280 m²/g.

2. The pitch pellets of claim 1, wherein the anticaking agent is chosen from hydrophobic or hydrophilic pyrogenic silicas and mixtures thereof.

3. The pitch pellets of claim 1, wherein the coating composition comprises at least 10% by mass of anticaking agent, relative to the total mass of the composition.

4. The pitch pellets of claim 3, wherein the coating composition comprises from 10% to 90% by mass of anticaking agent, relative to the total mass of the composition.

5. The pitch pellets of claim 4, wherein the coating composition comprises from 15% to 90% by mass of anticaking agent, relative to the total mass of the composition.

6. The pitch pellets of claim 1, wherein the coating composition further comprises at least one viscosifying compound.

7. The pitch pellets of claim 6, wherein the viscosifying compound is selected from the group consisting of:
gelling compounds;
polyethylene glycols (PEGs);
and mixtures thereof.

8. The pitch pellets of claim 6, wherein the viscosifying compound is chosen from gelling compounds of plant or animal origin.

9. The pitch pellets as claimed 8, wherein the gelling compound is selected from the group consisting of gelatin, agar-agar, alginates, cellulose derivatives, starches, modified starches and gellan gums.

10. The pitch pellets of claim 6, wherein the viscosifying compound is chosen from polyethylene glycols (PEGs) having a molecular weight of between 800 g·mol$^{-1}$ and 8000 g·mol$^{-1}$.

11. The pitch pellets of claim 10, wherein the viscosifying compound is selected from the group consisting of: a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) and a PEG with a molecular weight of 6000 g·mol$^{-1}$ (PEG-6000).

12. The pitch pellets of claim 1, wherein the coating composition represents between 0.2% and 10% by mass, relative to the total mass of the core of the pitch pellets.

13. The pitch pellets of claim 1, wherein the coating composition represents between 0.5% and 8% by mass, relative to the total mass of the core of the pitch pellets.

14. The pitch pellets of claim 1, wherein the coating composition represents between 0.5% and 5% by mass, relative to the total mass of the core of the pitch pellets.

15. The pitch pellets of claim 1, wherein the size of the pellets is such that the longest mean dimension is less than or equal to 50 mm.

16. The pitch pellets of claim 15, wherein the size of the pellets is such that the longest mean dimension is from 2 to 30 mm.

17. The pitch pellets of claim 1, wherein the pellets solid at ambient temperature.

18. A process for manufacturing the pitch pellets of claim 1, comprising:
    i) forming the core of the pellets using a first composition comprising at least one pitch, and
    ii) coating the core of the pellets over all or part of their surface with a coating composition comprising at least one anticaking compound.

19. A process comprising at least one of transporting, storing, and handling pitch at ambient temperature, wherein the pitch is in the form of the pitch pellets of claim 1.

* * * * *